United States Patent Office 3,078,184
Patented Feb. 19, 1963

3,078,184
DISILATRIOXANES, PROCESS FOR PREPARING SAME, PROCESS FOR COATING METAL, AND COATED METAL
Hans H. Ender, Buffalo, N.Y., assignor to Union Carbide Corporation, a corporation of New York
No Drawing. Filed Sept. 23, 1960, Ser. No. 57,911
18 Claims. (Cl. 117—132)

This invention relates to novel disilatrioxane compounds and to processes for their preparation.

My disilatrioxane compounds are polymeric materials which are represented by the formula:

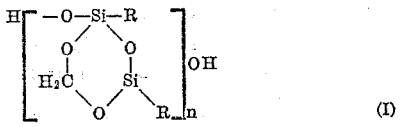
(I)

where R is a monovalent hydrocarbon group, preferably containing from 1 to about 10 carbon atoms and $n$ is an integer having a value of 2 to about 15. Thus, the compounds of this invention include those which are represented by the above formula wherein R in each case can be methyl, ethyl, propyl, phenyl, vinyl, allyl, octyl, cyclohexyl, n-butylphenyl, mesityl, and the like.

My novel process for preparing the disilatrioxanes of this invention comprises the reaction of a dialkoxymethane with a monovalent hydrocarbon trichlorosilane $RSiCl_3$, R being as previously defined, in the presence of a catalyst and hydrolyzing the resulting reaction intermediate. The reaction and hydrolysis are illustrated by the following equation:

$2nRSiCl_3 + nR'OCH_2OR' \rightarrow$
reaction intermediate $+ 2nR'Cl$

Reaction intermediate $+ (2n+1)H_2O \longrightarrow$

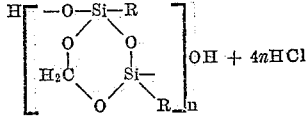 $OH + 4nHCl$ where R and $n$ are as previously defined and R' is lower alkyl group. By the term "lower alkyl group" as used herein is meant an alkyl group having from 1 through 4 carbon atoms.

The reaction intermediate as depicted in the equations shown above is a complex mixture of silicon compounds containing one silicon atom (or more than one silicon atom interconnected by silicon-to-oxygen-to-silicon linkages) wherein a monovalent hydrocarbon group is attached to each silicon atom, and other groups such as chlorine, hydroxy, alkoxy, chloroalkoxymethyleneoxy, $ClR''OCH_2O$— (where R'' is the chlorine substituted derivative of the alkyl group R), alkoxymethyleneoxy, $ROCH_2O$—, or chloromethoxy $ClCH_2O$— groups satisfy the remaining unfilled valences of silicon. The compounds comprising such mixtures are not easily separated from each other and are hydrolyzed as formed by the reaction. However, if desired, any fraction of silicon compounds contained in the mixture can be employed in the hydrolysis.

An advantageous procedure for conducting my process is to mix the trichlorosilane and the dialkoxymethane in a vessel equipped with refluxing means and a stirrer. The catalyst is added and the reaction, which is exothermic, begins. The boiling point of the reaction mixture is reached and refluxing starts. In the event that the exothermic heat becomes so great as to hinder smooth reaction, the trichlorosilane reactant can be added in a dropwise manner to the dialkoxymethane and catalyst instead of initially mixing both reactants, or external cooling such as air or water cooling can be applied in the conventional manner. Refluxing of the reaction mixture at atmospheric pressure is maintained until the reaction is complete. External heat is usually required to drive the reaction to completion and thus shorten the reaction time. During the reaction, HCl, alkyl chloride (derived from the alkyl groups of the dialkoxymethane and chlorine groups of the trichlorosilane) and chloromethylether ($ClCH_2OCH_3$) are removed. The reaction mixture is then cooled to room temperature, an organic solvent is added and the resulting solution is filtered. The solution is cooled to a temperature below 0° C. and water is added at such a rate as not to allow the temperature of the solution to increase above 0° C. The hydrolyzate solution thus obtained is washed free of acid, dried with a desiccant and the solvent evaporated.

The disilatrioxane product thus obtained contains a mixture of compounds of Formula I where $n$ has values in the range from 2 to about 15 or somewhat higher. Most of the compounds are those wherein $n$ is 8 or less and the average value of $n$ is generally in the range of about 4 to about 5.

Alternatively, the hydrolysis step can be carried out by pouring the mixture containing the reaction intermediate over crushed ice. The method is relatively fast and maintains the temperature below 0° C.

The dialkoxymethanes employed in my process are represented by the formula:

$R'OCH_2OR'$ where R' is a lower alkyl group and need not be the same in a single dialkoxymethane molecule. Such dialkoxymethanes include dimethoxymethane, diethoxymethane, methoxyethoxymethane, methoxyisopropoxymethane, dipropoxymethane, and dibutoxymethane. The trichlorosilanes which I use are those containing one monovalent hydrocarbon group attached to silicon and include methyltrichlorosilane, ethyltrichlorosilane, propyltrichlorosilane, vinyltrichlorosilane, phenyltrichlorosilane, cyclopentyltrichlorosilane, nonyltrichlorosilane, (phenylethyl) trichlorosilane, and the like. The molar ratio of reactants, that is, the molar ratio of dialkoxymethane to trichlorosilane, is not critical. Any ratio over a broad range can be used and, in fact, an excess of dialkoxymethane over the theoretical amount is desirable so as to act as a solvent for the reaction mixture. A preferred ratio of reactants is 4 to 6 moles of dialkoxymethane per mole of monovalent hydrocarbon trichlorosilane. Extreme dilution of one reactant in the other to the extent of causing sluggishness of reaction is to be avoided for practical reasons of shortening the reaction time. The application of heat after exothermic heat has subsided is also preferable so as to hasten completion of the reaction.

Temperatures employed in the reaction of the dialkoxymethane and trichlorosilane are not narrowly critical. Any temperatures below 100° C. are particularly advantageous since losses through decomposition of the reaction intermediate and the formation of polysiloxanes are minimized. Undue amounts of water are to be avoided in this reaction to minimize the formation of condensates and polysiloxanes which lowers the yield of ultimate product and complicates handling and recovery of product. Therefore, substantially anhydrous conditions should be maintained and the amount of water present is preferably limited to less than about one weight percent based on the amount of trichlorosilane. Temperatures employed in the hydrolysis of the reaction intermediates are maintained below about 10° C. in order to minimize the decomposition of disilatrioxane polymers formed and to minimize the formation of polysiloxanes by the hydrolysis and condensation of the trichlorosilane. The amount of water used in the hydrolysis is not narrowly critical and even large excesses over the amount theoretically required for hydrolysis can be used.

Solvents are not necessary in the reaction of the dialkoxymethane with trichlorosilane but are preferred in the hydrolysis step to provide a more easily handled hydrolysis mixture. Any common solvent can be employed, the most useful being the ether solvents such as diethyl ether, diisopropyl ether, dioxane, tetrahydofuran, ethylene glycol dimethyl ether, and the like, and hydrocarbon solvents such as toluene and xylene. The solvents most preferred are water-immiscible ether solvents such as diethyl ether, diisopropyl ether, methyl butyl ether and the like.

The preferred catalyst which is employed is finely divided aluminum. Ferric chloride mixed with finely divided copper also catalyzes the reaction, as do aluminum halides, such as aluminum fluoride, chloride, bromide and iodide. The aluminum or other catalyst can be further activated by such materials as finely divided copper, finely divided copper and mercuric chloride, or titanium tetrachloride. Amounts of catalyst as low as 0.05 weight percent based on the theoretical amount of trichlorosilane required for reaction are effective. The activators are effective in the same amounts as the primary catalysts. Larger amounts of catalyst and/or activator can be employed, the only upper limit being a matter of cost and convenience. Mixtures of the operable catalysts can also be used in the process of this invention.

The term "finely divided" as used herein means a maximum dimension for the individual particle of less than about 50 microns. Commercially available copper and aluminum powders having surface areas of about 140 square meters per gram were found to be particularly suitable for use in the process of this invention.

The disilatrioxane polymers of this invention are particularly useful in making protective coatings for metals including coatings for any solid material having a metal surface. The metals which can be coated with the disilatrioxanes of this invention are the solid metals below hafnium in the electromotive series of the chemical elements, for example, aluminum manganese, zinc, iron, cadmium, copper and silver. The disilatrioxane polymers can be applied to metals, or the metal surfaces of solid materials, as a solution in such polar solvents as alcohols, ethers, esters, aldehydes, ketones, and the like. Such solutions preferably contain from 8 to 10 weight percent of the disilatrioxane. Disilatrioxane polymers applied in this manner air dry at room temperature to form clear films. These films can be cured to solvent insoluble coatings by heating at elevated temperatures for short periods of time. For a satisfactory cure, the films should be heated to at least about 150° C. for at least about 15 minutes. These coatings are infusible, extremely heat resistant and are insoluble in practically all solvents and acids except hydrofluoric acid. Coatings of less than 0.25 mil in thickness provide good protection and coatings more than 5 mils in thickness can be obtained.

Metals protected by these coatings can be heated to temperatures of 400° C. or above without damage to the protective film. However, films greater than about one mil in thickness tend to become less flexible when heated to or above 400° C.

Even with short (about 15 minutes) cure times at 150° C. the above-described coatings on iron and aluminum provided excellent corrosion resistance to salt spray and on copper provided effective resistance to tarnish.

The following examples are presented.

*Example 1*

The following were mixed in a kettle equipped with a stirrer, thermometer, reflux condenser and inlet for nitrogen: 30 grams (0.2 mole) $CH_3SiCl_3$, 110 grams (1.4 mole) dimethoxymethane, 1.0 gram pulverized aluminum, 0.5 gram pulverized copper. After two hours heating at reflux, the temperature reached 60° C. in the liquid. Then the mixture was cooled to room temperature and 35 grams of isopropyl ether was added. Water was then added in very small amounts; when no more increase in temperature was observed upon addition of water, larger amounts were added and the ether solution was washed free of acid. The acid-free ether solution was then dried over anhydrous calcium chloride. The isopropyl ether was then evaporated under reduced pressure to yield a clear oil. This product oil was identified by elemental and infrared spectrographic analysis as a mixture of compounds

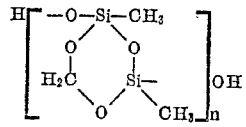

wherein $n$ had an average value of about 4. Calculated for $C_{12}H_{34}O_{17}Si_8$ ($n=4$): C, 21.4%; H, 5.1%; Si, 33.3%; OH, 5.05%. Found: C, 22.1%; H, 5.8%; Si, 34.7%; OH, 4.8%.

In a similar manner 0.2 mole of phenyltrichlorosilane and 1.2 moles of diisopropoxymethane are reacted and the intermediate product hydrolyzed in diethyl ether to yield a mixture of compounds

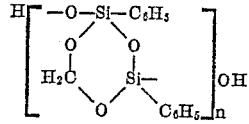

wherein $n$ has an average value of about 4.

*Example 2*

About 1140 grams (15 moles) of dimethoxymethane and about 750 grams (5 moles) of $CH_3SiCl_3$ were combined in a 5 liter kettle equipped with a stirrer, reflux condenser, and a gas inlet. The upper end of the reflux condenser was connected to a Dry Ice-cooled trap. Nitrogen was passed through the apparatus in a slow stream.

The $CH_3SiCl_3$ was added slowly to the dimethoxymethane and the mixture heated spontaneously to 40–45° C. due to traces of moisture in the dimethoxymethane. After addition of the $CH_3SiCl_3$ the mixture was allowed to stand at room temperature overnight. Then the catalyst, 5 grams of aluminum powder and 2.5 grams of copper powder, was added and the mixture refluxed for 4 to 5 hours. The boiling point was at the beginning near 48° C. and rose continuously to 59–60° C.

The gasses evolved during the reaction (except hydrogen) condensed in the Dry Ice-cooled trap, and included HCl, $CH_3Cl$, and $CH_3SiCl_3$. At the beginning of the reaction some hydrogen was released due to the moisture content of the dimethoxymethane which formed HCl by reaction with $CH_3SiCl_3$, and the HCl in turn reacted with the aluminum to release hydrogen gas.

After 5 hr. refluxing the mixture was cooled to room temperature, 500 grams of isopropyl ether were added and the resulting mixture filtered.

For the hydrolysis step, the mixture was cooled to about −20° C. and water was added slowly thus preventing any increase in temperature above 0° C. After each addition of water, a marked increase of temperature was observed. To insure complete hydrolysis, about 750 milliliters water was added (about 3 times the theoretical amount).

The hydrolyzate was transferred to a separatory funnel. The aqueous layer was separated and diluted with an equal volume cold water; some additional upper layer separated, which was added to the initially formed isopropyl ether layer. The combined ether solutions were washed four times with 100 milliliter portions of distilled water until neutral. Emulsified water was precipitated with a small amount NaCl, the solution finally dried with anhydrous $Na_2SO_4$, and the dried solution was then filtered to remove the drying agent.

The ether was then evaporated under reduced pressure to yield a product oil containing a mixture of compounds having the formula

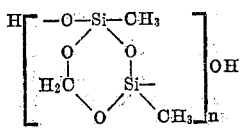

where *n* had values of 2 to about 6 and an average value of about 4. The overall yield of product oil was 80 percent based on methyltrichlorosilane.

*Example 3*

An isopropyl ether solution of the compound

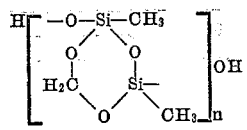

where *n* had an average value of about 4 was prepared, the solution containing about 8 weight percent of the disilatrioxane. This solution was applied to the surface of a piece of cast iron and a disilatrioxane film 1 to 2 mils in thickness remained after evaporation of the solvent. The film-covered piece of cast iron was then heated until the iron glowed red. The film cured rapidly to a protective coating and, on cooling, the protective coating remained intact, had not charred, and had retained its gloss.

*Example 4*

Following the procedure of Example 3, a disilatrioxane film about 0.25 mil in thickness was applied to a copper surface and the film was cured to an insoluble coating by heating at 200° C. for 2 hours. The coated copper was then heated for 24 hours at 250° C. and for 72 hours at 200° C. On cooling, the protective coating was found intact.

What is claimed is:

1. An organosilicon compound represented by the formula:

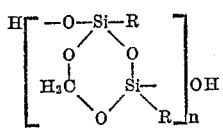

where R is a monovalent hydrocarbon group containing from 1 to about 10 carbon atoms and *n* is an integer having a value from 2 to about 15.

2. A compound in accordance with claim 1 where R is methyl.

3. A compound in accordance with claim 1 where R is phenyl.

4. A mixture of organosilicon compounds represented by the formula:

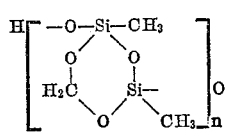

wherein *n* is an integer having a value from 2 to about 15 and the average value of *n* in said mixture is about 4.

5. The process for preparing disilatrioxane polymers which comprises mixing together (1) a chlorosilane of the formula RSiCl₃, where R is a monovalent hydrocarbon group containing from 1 to about 10 carbon atoms, (2) a dialkoxymethane of the formula R'—OCH₂O—R', where R' is a lower alkyl group, and (3) at least one member selected from the class consisting of (*a*) finely divided aluminum, (*b*) aluminum halides and (*c*) ferric chloride and finely divided copper, heating said mixture to form an intermediate reaction product and thereafter hydrolyzing said intermediate to form said disilatrioxane polymers.

6. The process for preparing disilatrioxane polymers which comprises mixing together (1) a chlorosilane of the formula RSiCl₃, where R is a monovalent hydrocarbon group containing from 1 to about 10 carbon atoms, (2) a dialkoxymethane of the formula R'—OCH₂O—R', where R' is a lower alkyl group, and (3) a finely divided aluminum catalyst and a member selected from the class consisting of finely divided copper, finely divided copper and mercuric chloride, and titanium tetrachloride, heating said mixture to form an intermediate reaction product, and thereafter hydrolyzing said intermediate to form said disilatrioxane polymers.

7. The process for preparing disilatrioxane polymers which comprises mixing together (1) a chlorosilane of the formula RSiCl₃, where R is a monovalent hydrocarbon group containing from 1 to about 10 carbon atoms, (2) a dialkoxymethane of the formula R'—OCH₂O—R', where R' is a lower alkyl group, and (3) a finely divided aluminum catalyst and a finely divided copper activator, heating said mixture to form an intermediate reaction product and thereafter hydrolyzing said intermediate to form said disilatrioxane polymers.

8. The process in accordance with claim 7 wherein R' is methyl.

9. The process in accordance with claim 7 wherein R is methyl.

10. The process in accordance with claim 7 wherein R is phenyl.

11. A process for producing protective coatings for solid metals below hafnium in the electromotive series of the chemical elements which comprises applying to said metal a solution in a polar solvent of a compound represented by the formula:

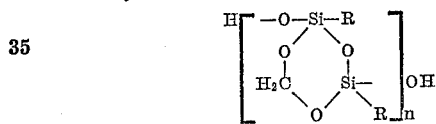

where R is a monovalent hydrocarbon group containing from 1 to about 10 carbon atoms and *n* is an integer having a value from 2 to about 15 to form a disilatrioxane film and heating said film to a temperature of at least about 150° C. for at least about 15 minutes.

12. Process in accordance with claim 11 wherein said metal is selected from the class consisting of iron, aluminum and copper.

13. A coated article comprising a solid base material having as a surface thereof a solid metal below hafnium in the electromotive series of the chemical elements and a coating on said surface comprising a heat-cured film of an organosilicon compound represented by the formula:

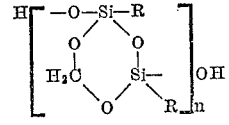

wherein R is a monovalent hydrocarbon group containing from 1 to about 10 carbon atoms and *n* is an integer having a value from 2 to about 15.

14. A coated article comprising a solid base material having as a surface thereof a solid metal below hafnium in the electromotive series of the chemical elements and a coating on said surface comprising a heat-cured film of a mixture of organosilicon compounds represented by the formula:

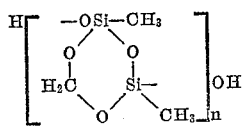

wherein *n* is an integer having a value from 2 to about 15 and the average value of *n* in said mixture is about 4.

15. A coated article in accordance with claim 14 wherein said metal is selected from the class consisting of iron, aluminum and copper.

16. A coated article comprising a solid metal below hafnium in the electromotive series of the chemical elements and a coating on said metal comprising a heat-cured film of an organosilicon compound represented by the formula:

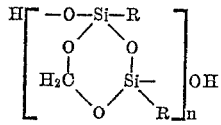

where R is a monovalent hydrocarbon group containing from 1 to about 10 carbon atoms and $n$ is an integer having a value from 2 to about 15.

17. A coated article comprising a solid metal below hafnium in the electromotive series of the chemical elements and a coating on said metal comprising a heat-cured film of a mixture of organosilicon compounds represented by the formula:

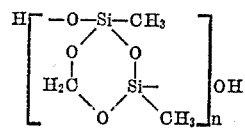

wherein $n$ is an integer having a value from 2 to about 15 and the average value of $n$ in said mixture is about 4.

18. A coated article in accordance with claim 17 wherein said metal is selected from the class consisting of iron, aluminum and copper.

References Cited in the file of this patent
UNITED STATES PATENTS

| | | |
|---|---|---|
| 2,405,988 | Barry | Aug. 20, 1946 |
| 2,443,353 | Hyde et al. | June 15, 1948 |
| 2,686,654 | Roush | Aug. 17, 1954 |
| 2,906,768 | Haluska | Sept. 29, 1959 |